(12) United States Patent
Lu et al.

(10) Patent No.: US 10,616,437 B2
(45) Date of Patent: Apr. 7, 2020

(54) OPTICAL DEVICE HAVING HOUSING ROTATABLE RELATIVE TO FIXING MEMBER DETACHABLY AFFIXED TO SCANNER

(71) Applicant: Wistron Corp., New Taipei (TW)

(72) Inventors: Chia-Fong Lu, New Taipei (TW); Chang Chun Wang, New Taipei (TW); Su-Kai Hsu, New Taipei (TW); Jui-Kai Cheng, New Taipei (TW); Ming-Feng Tsai, New Taipei (TW); Ying-che Huang, New Taipei (TW)

(73) Assignee: WISTRON CORP., New Taipei (TW)

( * ) Notice: Subject to any disclaimer, the term of this patent is extended or adjusted under 35 U.S.C. 154(b) by 311 days.

(21) Appl. No.: 15/716,194

(22) Filed: Sep. 26, 2017

(65) Prior Publication Data
US 2018/0343356 A1 Nov. 29, 2018

(30) Foreign Application Priority Data
May 26, 2017 (TW) .............................. 106117570 A

(51) Int. Cl.
*G02B 7/18* (2006.01)
*G02B 7/182* (2006.01)
(Continued)

(52) U.S. Cl.
CPC ................. *H04N 1/04* (2013.01); *G02B 7/18* (2013.01); *G02B 26/10* (2013.01); *H04N 1/00541* (2013.01); *H04N 1/02895* (2013.01); *G02B 7/182* (2013.01); *G02B 7/1805* (2013.01); *G02B 7/198* (2013.01); *G02B 26/0816* (2013.01); *G02B 26/108* (2013.01)

(58) Field of Classification Search
CPC ........ G02B 7/18; G02B 7/1805; G02B 7/182; G02B 7/198; G02B 26/108; G02B 26/0816; G02B 26/10–129; H04N 1/00326; H04N 1/00334; H04N 1/00363; H04N 1/00541; H04N 1/02895; H04N 1/04–207
USPC ......... 359/201.1, 201.2, 205.1, 207.8, 221.2, 359/827, 844
See application file for complete search history.

(56) References Cited

U.S. PATENT DOCUMENTS 4,984,882 A * 1/1991 Boyd ..................... G02B 7/182
24/543
5,610,751 A * 3/1997 Sweeney ................ G02B 26/10
359/197.1
(Continued)

FOREIGN PATENT DOCUMENTS

CN 103293828 A 9/2013

*Primary Examiner* — Ryan S Dunning

(57) ABSTRACT

An optical device detachably disposed on a scanner is provided, including a housing, a first opening, a second opening, a lens module, and a fixing member. The housing has a first surface and a second surface connected to the first surface. The first opening and the second opening are respectively formed on the first surface and the second surface. The lens module is disposed in the housing. The fixing member is detachably affixed to the scanner and pivotally connected to the housing. The light provided by the scanner enters the housing through the first opening, and the lens module guides the light to leave the housing through the second opening. The light leaving the housing through the second opening can fall on a scanned object.

14 Claims, 8 Drawing Sheets

(51) Int. Cl.
  *G02B 7/198* (2006.01)
  *G02B 26/08* (2006.01)
  *G02B 26/10* (2006.01)
  *H04N 1/00* (2006.01)
  *H04N 1/028* (2006.01)
  *H04N 1/04* (2006.01)

(56) References Cited

U.S. PATENT DOCUMENTS 6,330,082 B1 * 12/2001 Oliver .................... G02B 26/10
                                                   358/473
2010/0110509 A1 * 5/2010 Cui .................... H04N 1/00002
                                                   358/498

* cited by examiner

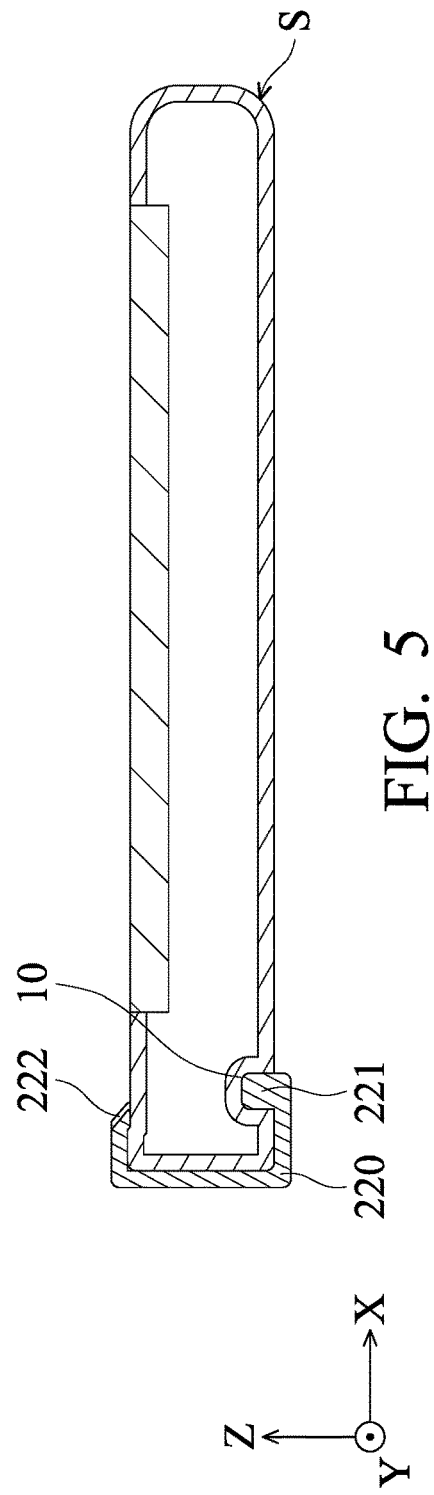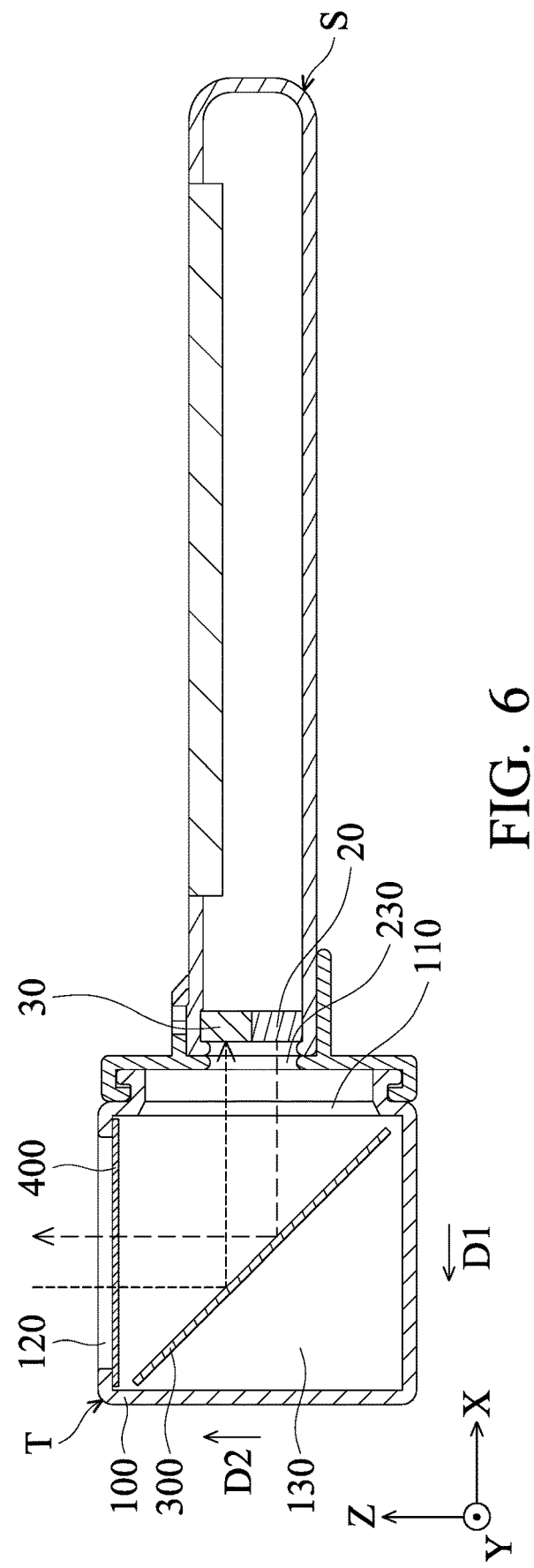

US 10,616,437 B2

OPTICAL DEVICE HAVING HOUSING ROTATABLE RELATIVE TO FIXING MEMBER DETACHABLY AFFIXED TO SCANNER

CROSS REFERENCE TO RELATED APPLICATIONS

The present application is based on, and claims priority from, Taiwan Patent Application No. 106117570, filed on May 26, 2017, the disclosure of which is hereby incorporated by reference herein in its entirety.

BACKGROUND OF THE INVENTION

Field of the Invention

The application relates in general to an optical device, and in particular, to an optical device disposed on a scanner.

Description of the Related Art

A conventional code scanner emits and receives light in a single direction, so as to scan barcodes and QR codes, for example. Some code scanners emit and receive light in a longitudinal direction, for example, while other code scanners emit and receive light in a direction that is perpendicular to the longitudinal direction. A user cannot choose the scanning direction when using the aforementioned code scanners, however. When the scanning direction of a code scanner does not match the position of the code (for example, the code is disposed between the stacking objects where the code scanner cannot enter), the user has to change the code scanner for another one, which can scan in a different direction. Since this is inconvenient during usage, how to address the aforementioned problem has become an important issue.

BRIEF SUMMARY OF INVENTION

To address the deficiencies of conventional products, an embodiment of the invention provides an optical device detachably disposed on a scanner, including a housing, a first opening, a second opening, a lens module, and a fixing member. The housing has a first surface and a second surface connected to the first surface. The first opening and the second opening are respectively formed on the first surface and the second surface. The lens module is disposed in the housing. The fixing member is detachably affixed to the scanner and pivotally connected to the housing. The light provided by the scanner enters the housing through the first opening, and the lens module guides the light to leave the housing through the second opening. The light leaving the housing through the second opening can fall on a scanned object.

In some embodiments, the light falling on the scanned object can be reflected by the scanned object and enter the housing through the second opening, and the lens module guides the light to leave the housing from the first opening, wherein the light leaving the first opening can be received by the scanner.

In some embodiments, the housing further comprises a protruding portion, protruding from the first surface and surrounding the first opening, and the fixing member further comprises a guiding slot, wherein the protruding portion is slidably accommodated in the guiding slot.

In some embodiments, the protruding portion comprises an L-shaped cross-section.

In some embodiments, the housing further comprises an engagement portion, and the fixing member further comprises a plurality of engagement recesses corresponding to the engagement portion.

In some embodiments, the fixing member further comprises an engagement portion, and the housing further comprises a plurality of engagement recesses corresponding to the engagement portion.

In some embodiments, the engagement portion is flexible.

In some embodiments, the light provided by the scanner substantially enters the housing along a first direction, and leaves the housing along a second direction, wherein the angle between the first direction and the second direction is between 5 and 175 degrees.

In some embodiments, the lens module comprises a reflecting mirror.

In some embodiments, the lens module comprises a pentaprism.

In some embodiments, the optical device further comprises a lens covering the second opening.

In some embodiments, the fixing member comprises a C-shaped structure, wherein when the fixing member is affixed to the scanner, the opposite ends of the C-shaped structure respectively contact the opposite surfaces of the scanner.

In some embodiments, the fixing member comprises at least one protrusion, wherein when the fixing member is affixed to the scanner, the protrusion enters a recess of the scanner.

BRIEF DESCRIPTION OF DRAWINGS

The invention can be more fully understood by reading the subsequent detailed description and examples with references made to the accompanying drawings, wherein:

FIG. 5 is a cross-sectional view along line A-A in FIG. 4;

FIG. 6 is a cross-sectional view along line B-B in FIG. 4;

DETAILED DESCRIPTION OF INVENTION

The making and using of the embodiments of the optical device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
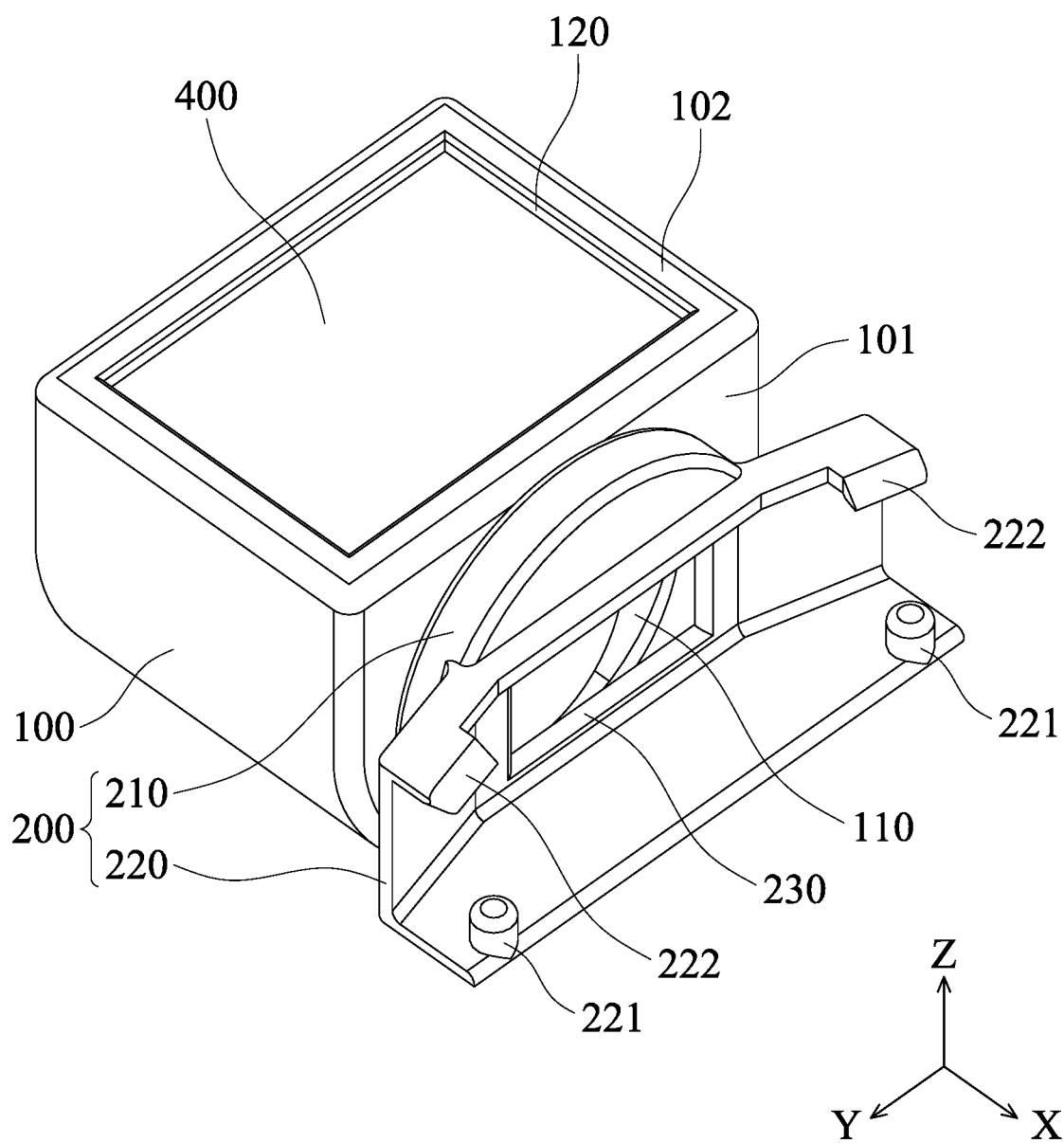
FIG. 1 is a schematic diagram of an optical device according to an embodiment of the invention.
Figure 2:
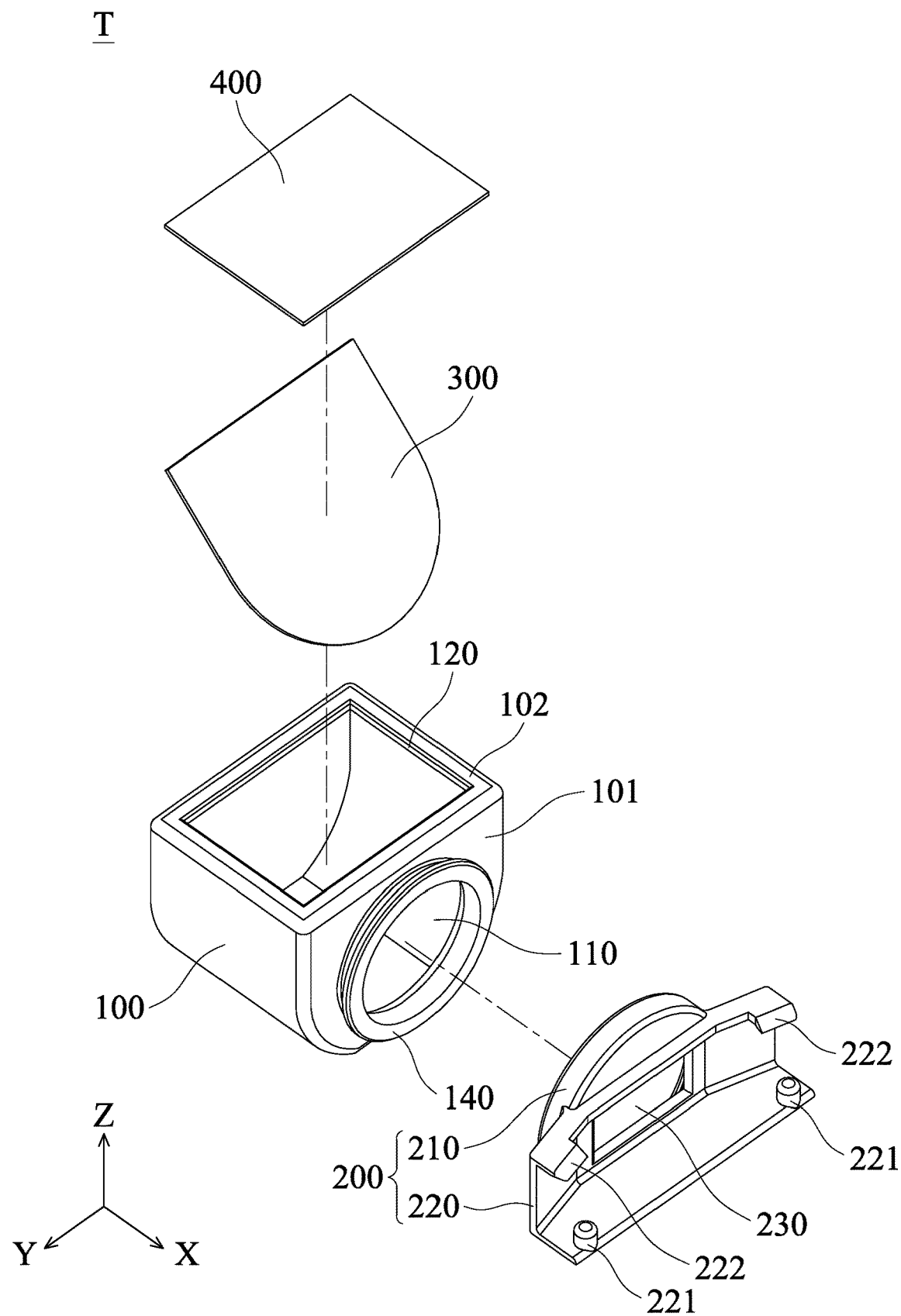
FIG. 2 is an exploded-view diagram of an optical device according to an embodiment of the invention.
Figure 3:
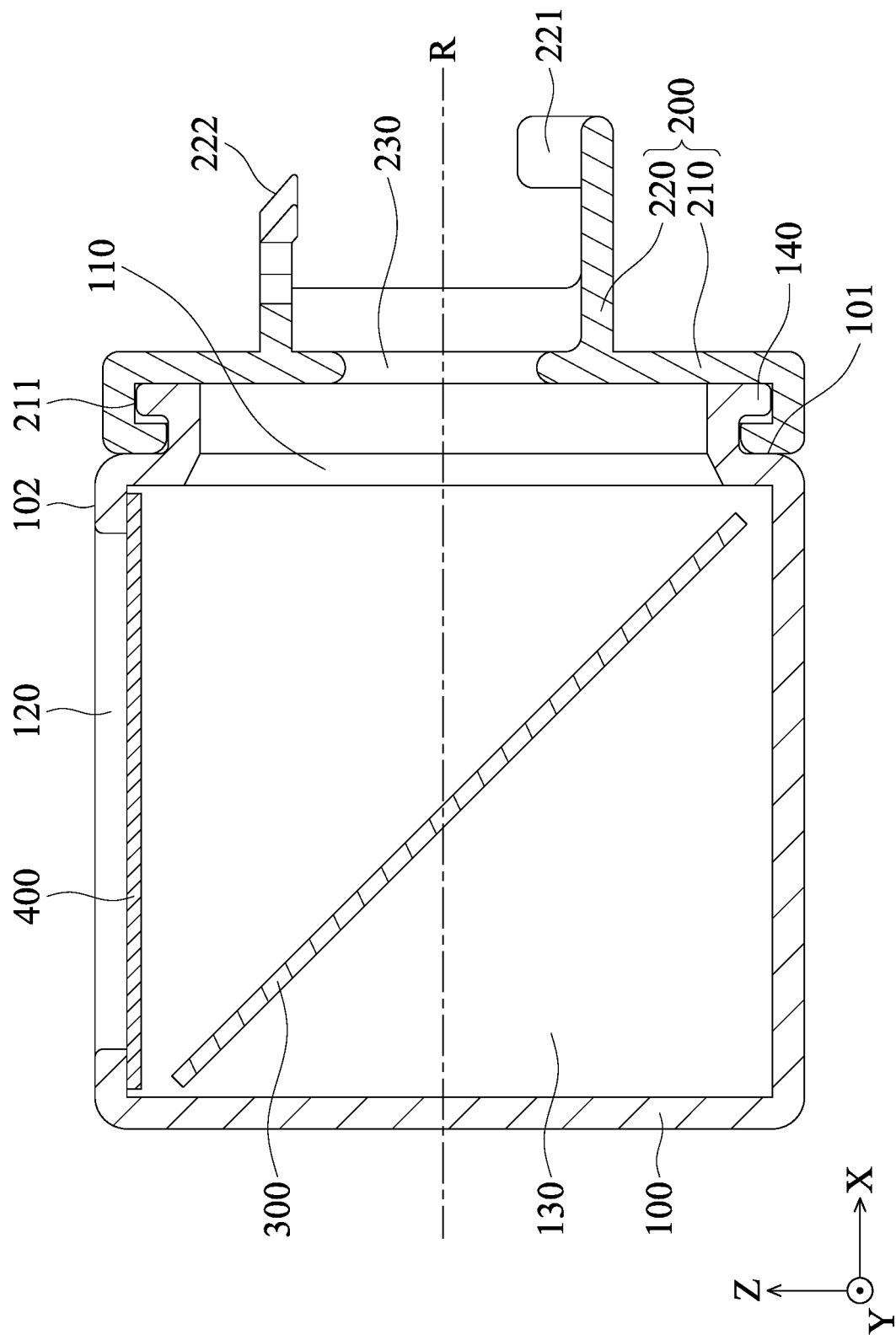
FIG. 3 is a cross-sectional view of an optical device according to an embodiment of the invention.

FIG. 1 is a schematic diagram of an optical device T according to an embodiment of the invention, and FIGS. 2 and 3 are exploded-view diagram and cross-sectional view of the aforementioned optical device T respectively. Referring to FIGS. 1-3, the optical device T primarily comprises a housing 100, a fixing member 200, a lens module 300, and a lens 400. The housing 100 is pivotally connected to the fixing member 200, and the lens module 300 and the lens 400 are disposed in the housing 100.

As shown in FIGS. 1-3, the housing 100 has a first surface 101 and a second surface 102, and comprises a first opening 110, a second opening 120, and an accommodating space 130. The first surface 101 is adjacent to and connected to the second surface 102. The first opening 110 and the second opening 120 are respectively formed on the first surface 101 and the second surface 102, and are communicated with the accommodating space 130 of the housing 100.

As shown in FIG. 3, the lens module 300 and the lens 400 are disposed in the accommodating space 130 of the housing 100. The lens 400 covers the second opening 120 to prevent objects (such as dust or liquid) from entering the optical device T through the second opening 120. In this embodiment, the lens module 300 comprises a reflecting mirror, which is inclined relative to the first opening 110 and the second opening 120. The reflecting material is coated on the surface of the reflecting mirror facing the first opening 110 and the second opening 120.

The housing 100 can be opaque, so as to prevent external light from entering the housing. For example, the housing 100 can comprise opaque plastic or metal. Furthermore, as shown in FIGS. 2 and 3, in this embodiment, the housing 100 further comprises a protruding portion 140 protruding from the first surface 101 and surrounding the first opening 110. The protruding portion 140 has an L-shaped cross-section.

Referring to FIGS. 2 and 3, the fixing member 200 comprises a disk structure 210 and a C-shaped structure 220. A guiding slot 211 is formed on the disk structure 210, and the shape thereof the guiding slot 211 corresponds to the protruding portion 140 of the housing 100. When the housing 100 is connected to the fixing member 200, the protruding portion 140 enters the guiding slot 211 of the disk structure 210, so as to prevent the housing from separating from the fixing member 200. Since the guiding slot 211 is formed on the disk structure 210, the protruding portion 140 can slide along the guiding slot 211, and the housing 100 can rotate around a rotation axis R relative to the fixing member 200.

Figure 4:
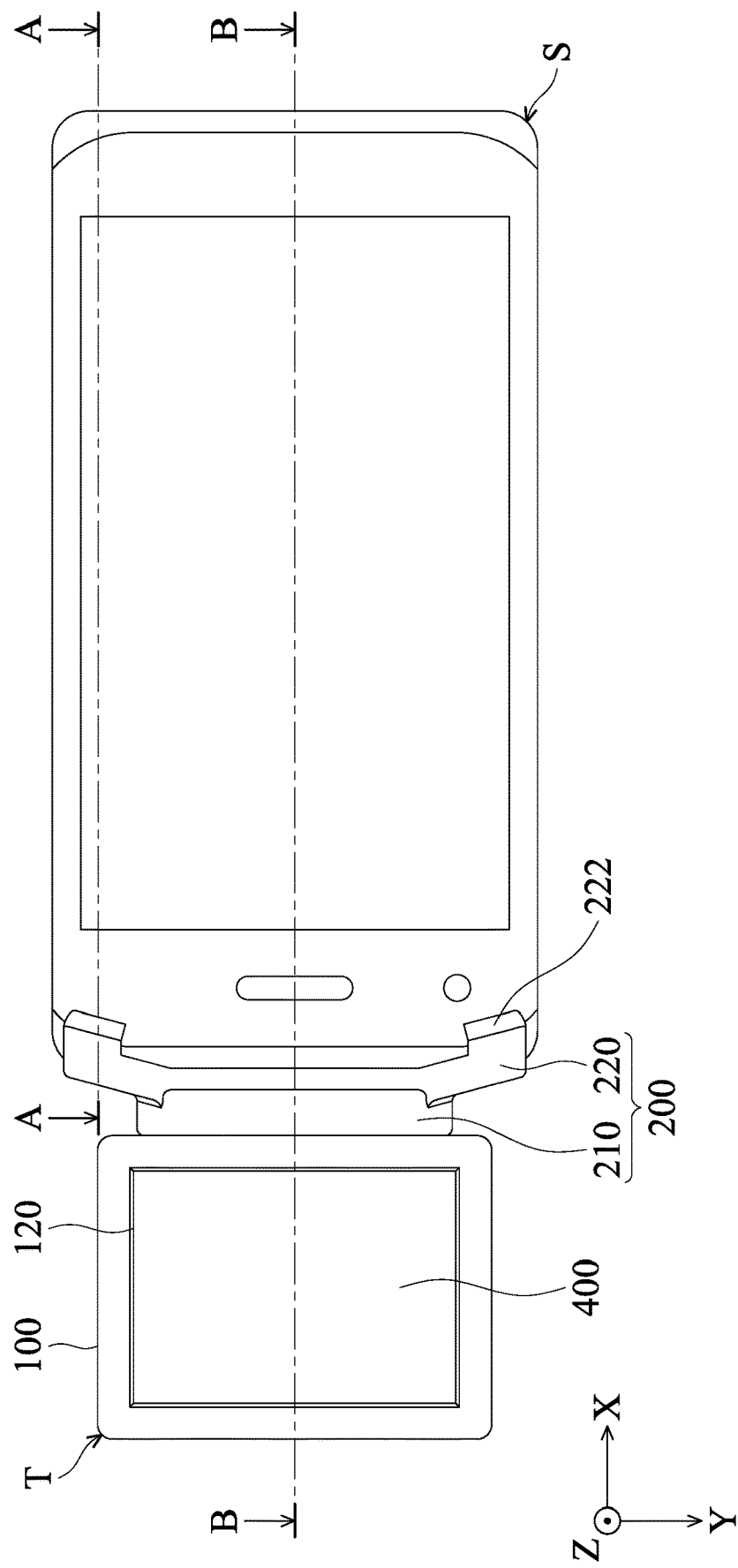
FIG. 4 is a schematic diagram of an optical device connected to a scanner according to an embodiment of the invention.

The C-shaped structure 220 is used to affix the optical device T to the scanner S (as shown in FIGS. 4-6). The opposite ends of the C-shaped structure 220 respectively have at least one protrusion 221 and at least one attached portion 222. Furthermore, the fixing member 200 further comprises a hole 230 extending through the C-shaped structure 220 and the disk structure 210. When the housing 100 is joined to the fixing member 200, the hole 230 corresponds to the first opening 110 of the housing 100.

It should be noted that the area of the first opening 110 of the housing 100 is greater than that of the hole 230. Moreover, no matter where the housing 100 rotates to relative to the fixing member 200, the projection of the first opening 110 on a virtual plane covers the projection of the hole 230 on a virtual plane, so as to prevent the first opening 110 from shielding the hole 230.

FIG. 4 is a schematic diagram representing how the optical device T is assembled on the scanner S in a detachable manner, and FIGS. 5 and 6 are cross-sectional views along lines A-A and B-B respectively. As shown in FIGS. 4-6, when the optical device T is connected to the scanner S, the opposite ends of the C-shaped structure 220 of the fixing member 200 contact the opposite surfaces of the scanner S, and the scanner S can be clamped by the fixing member 200. The protrusion 221 on one of the ends of the C-shaped structure 220 can enter the recess 10 of the scanner S, and therefore, the fixing member 200 can be steadily disposed on the scanner S.

As shown in FIG. 6, when the optical device T is connected to the scanner S, the hole 230 of the fixing member 200 is aligned with an emitter 20 and a receiver 30 in the scanner S. The light provided by the emitter 20 (such as infrared light) moves along a first direction D1 and enters the housing 100 through the hole 230 and the first opening 110. Subsequently, the light can be reflected and guided by the lens module 300 and moves along a second direction D2, and leaves the housing 100 through the second opening 120. The light leaving the housing 100 can fall on a scanned object, such as a paper with the code.

After the light falls on the scanned object, it will be reflected by the scanned object and enter the housing 100 through the second opening 120, and then the light will be reflected and guided by the lens module 300 and pass through the first opening 110 and the hole 230. Finally, the receiver 30 of the scanner S receives the light.

It should be noted that the reflected angle of the light (i.e. the angle between the first direction D1 and the second direction D2) can be changed by adjusting the disposing angle of the lens module 300 in the housing 100. For example, the angle between the first direction D1 and the second direction D2 can be between 5 and 175 degrees.

Furthermore, since the fixing member 200 of the optical device T is flexible, the optical device T can easily be removed from the scanner S when the user desires to use the directional scanner S (that is, when the user wants to let the light emit in the direction of the −X axis). Therefore, the moving direction of the light of the scanner S can easily be adjusted by the optical device T.

Figure 7A:
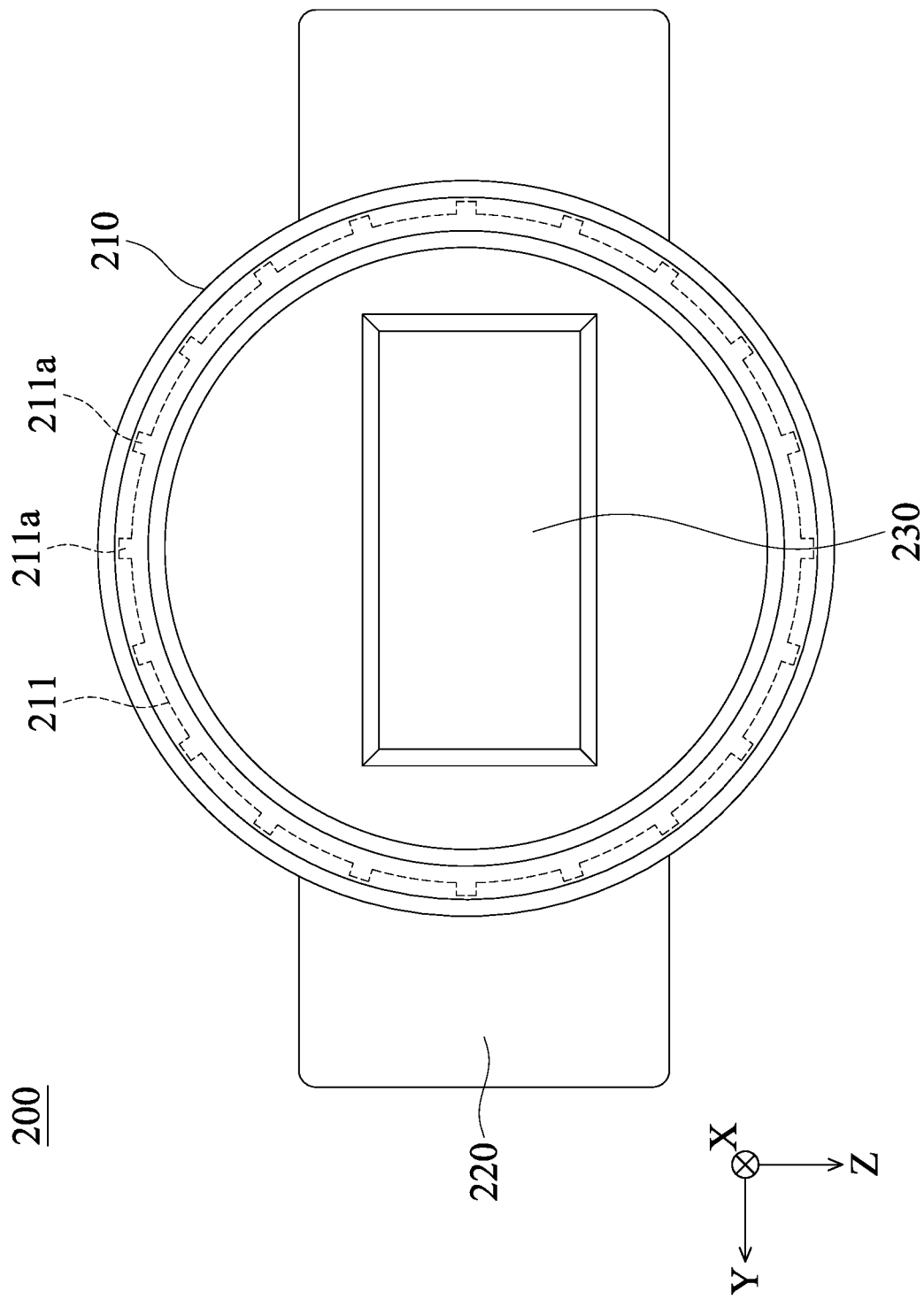
FIG. 7A is a schematic diagram of a fixing member according to another embodiment of the invention.
Figure 7B:
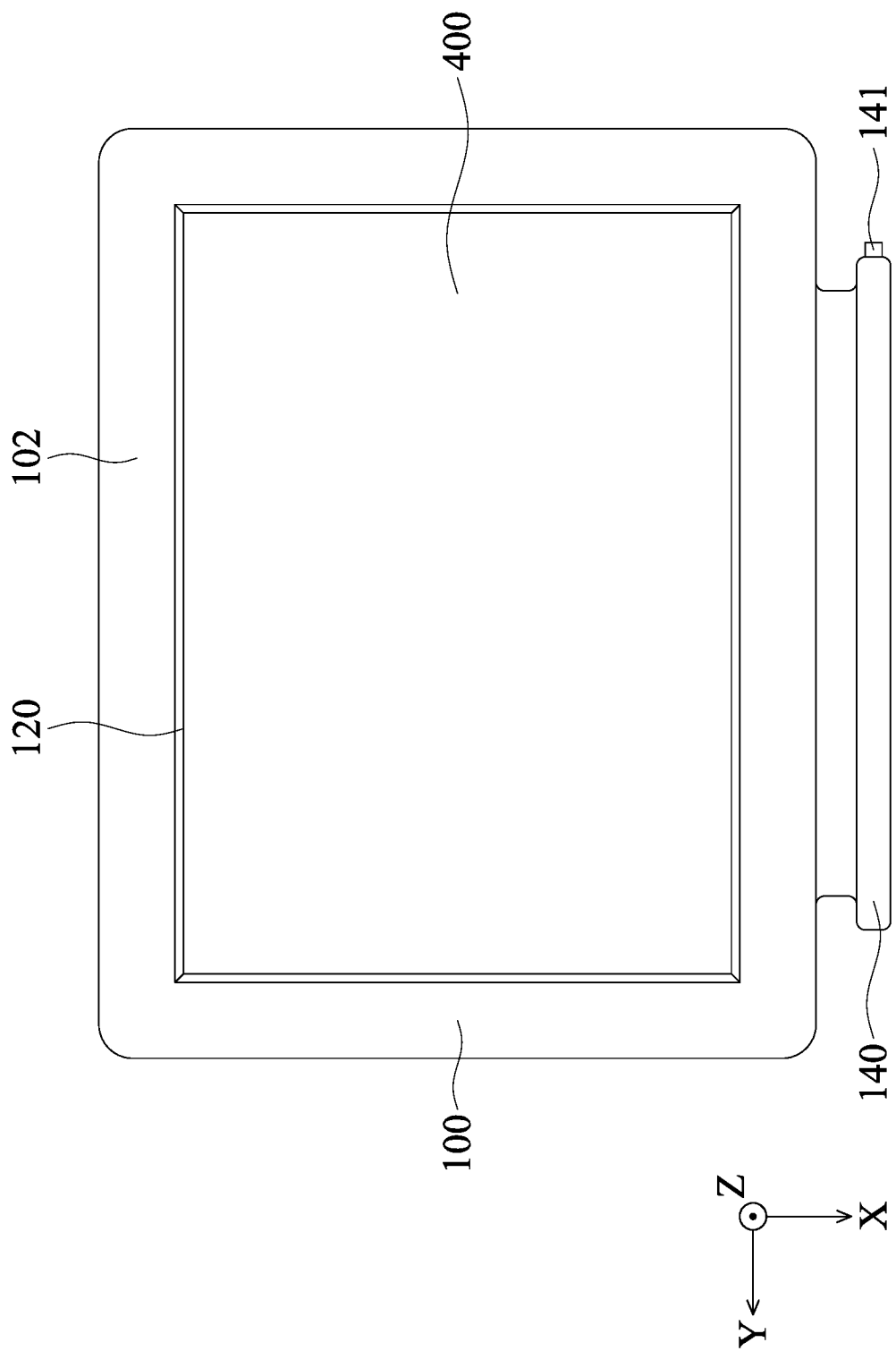
FIG. 7B is a schematic diagram of a housing according to another embodiment of the invention.

Referring to FIGS. 7A and 7B, in another embodiment, a plurality of engagement recesses 211a are formed on the wall of the guiding slot 211 of the fixing member 200, and an engagement portion 140 is disposed on the protruding portion 140 of the housing 100. The appearance and the dimensions of the engagement portion 141 correspond to each of the engagement recesses 211a, and the engagement portion 141 is flexible. When the user use the optical device T and the scanner S, the engagement portion 141 can enter one of the engagement recesses 141, so that the housing 100 does not rotate relative to the fixing member 200. When the orientation of the second hole 120 needs to be adjusted according to the position of the scanned object, the user can apply force to let the housing 100 rotate relative to the fixing member 200, and the engagement portion 141 is deformed and slides out from the engagement recess 211a. When the position of the engagement portion 141 corresponds to another engagement recess 211a, it enters this engagement recess 211a, and the housing 100 can be fixed relative to the fixing member 200.

In some embodiments, the engagement portion is formed in the guiding slot 211 and extended toward the rotation axis R, and the engagement recesses are formed on the protruding portion 140 of the housing 100.

Figure 8:
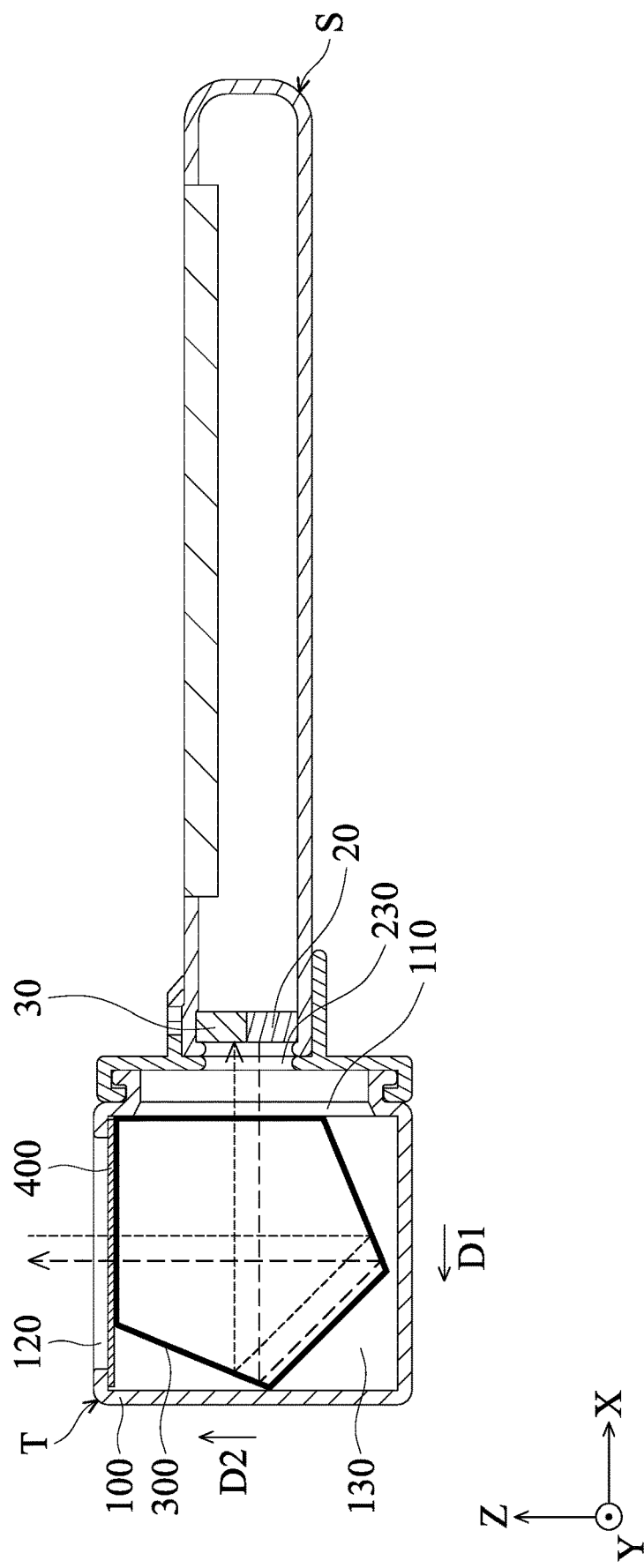
FIG. 8 is a schematic diagram of an optical device connected to a scanner according to another embodiment of the invention.

Referring to FIG. 8, in another embodiment, the lens module 300 can comprise a pentaprism. Therefore, after the guidance of the pentaprism, the light received by the scanner S is positive, and it does not need to be converted by the scanner S.

In summary, an optical device is provided, wherein the optical device is detachably disposed on a scanner. When the optical device is not disposed on the scanner, the scanner can provide the light in a first direction for scanning a scanned object. When the optical device is disposed on the scanner, the light provided by the scanner can be guided and move in a second direction, and a scanned object in another position relative to the scanner can be scanned.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical device detachably disposed on a scanner, comprising:
   a housing, having a first surface and a second surface, wherein the first surface is connected to the second surface;
   a first opening, formed on the first surface;
   a second opening, formed on the second surface;
   a lens module, disposed in the housing; and
   a fixing member, detachably affixed to the scanner and pivotally connected to the housing, wherein the light provided by the scanner enters the housing along a first direction through the first opening, and the lens module guides the light to leave the housing through the second opening, wherein the light leaving the housing can fall on a scanned object, wherein the housing is rotatable relative to the fixing member around the first direction.

2. The optical device as claimed in claim 1, wherein the light falling on the scanned object can be reflected by the scanned object and enter the housing through the second opening, and the lens module guides the light to leave the housing from the first opening, wherein the light leaving the first opening can be received by the scanner.

3. The optical device as claimed in claim 1, wherein the housing further comprises a protruding portion, protruding from the first surface and surrounding the first opening, and the fixing member further comprises a guiding slot, wherein the protruding portion is slidably accommodated in the guiding slot.

4. The optical device as claimed in claim 3, wherein the protruding portion comprises an L-shaped cross-section.

5. The optical device as claimed in claim 1, wherein the housing further comprises an engagement portion, and the fixing member further comprises a plurality of engagement recesses corresponding to the engagement portion.

6. The optical device as claimed in claim 5, wherein the engagement portion is flexible.

7. The optical device as claimed in claim 1, wherein the fixing member further comprises an engagement portion, and the housing further comprises a plurality of engagement recesses corresponding to the engagement portion.

8. The optical device as claimed in claim 7, wherein the engagement portion is flexible.

9. The optical device as claimed in claim 1, wherein the light provided by the scanner substantially leaves the housing along a second direction, wherein the angle between the first direction and the second direction is between 5 and 175 degrees.

10. The optical device as claimed in claim 1, wherein the lens module comprises a reflecting mirror.

11. The optical device as claimed in claim 1, wherein the lens module comprises a pentaprism.

12. The optical device as claimed in claim 1, wherein the optical device further comprises a lens covering the second opening.

13. The optical device as claimed in claim 1, wherein the fixing member comprises a C-shaped structure, wherein when the fixing member is affixed to the scanner, opposite ends of the C-shaped structure respectively contact opposite surfaces of the scanner.

14. The optical device as claimed in claim 1, wherein the fixing member comprises at least one protrusion, wherein when the fixing member is affixed to the scanner, the protrusion enters a recess of the scanner.

* * * * *